United States Patent
Tsegay

(10) Patent No.: US 8,280,432 B2
(45) Date of Patent: Oct. 2, 2012

(54) MOBILE COMMUNICATION DEVICE AND METHOD FOR OPERATING A MOBILE COMMUNICATION DEVICE

(75) Inventor: Kahsay Tsegay, Hjarup (SE)

(73) Assignee: Sony Mobile AB, Munich (DE)

( * ) Notice: Subject to any disclaimer, the term of this patent is extended or adjusted under 35 U.S.C. 154(b) by 348 days.

(21) Appl. No.: 12/574,200

(22) Filed: Oct. 6, 2009

(65) Prior Publication Data
US 2011/0081944 A1    Apr. 7, 2011

(51) Int. Cl.
*H04M 1/00* (2006.01)
(52) U.S. Cl. .............. 455/550.1; 455/566; 455/556.1; 455/574; 455/572; 370/311
(58) Field of Classification Search ............... 455/550.1, 455/566, 556.1, 572, 574; 345/619; 715/700; 370/311
See application file for complete search history.

(56) References Cited

U.S. PATENT DOCUMENTS
| | | | |
|---|---|---|---|
| 7,302,089 B1 | 11/2007 | Smits | |
| 2005/0003812 A1* | 1/2005 | Gladwin et al. | ........... 455/426.1 |
| 2008/0090616 A1 | 4/2008 | Sutardja | |
| 2009/0122145 A1 | 5/2009 | Ono | |
| 2009/0201264 A1 | 8/2009 | Hsu et al. | |
| 2010/0137027 A1* | 6/2010 | Kim | .......................... 455/556.1 |

FOREIGN PATENT DOCUMENTS
JP       2002111801 A  *  4/2002

OTHER PUBLICATIONS

International Search Report, corresponding to PCT/EP2010/054194, mailed on Jul. 7, 2010.
Written Opinion of the International Searching Authority, corresponding to PCT/EP2010/054194, mailed Jul. 7, 2010.

* cited by examiner

*Primary Examiner* — Kathy Wang-Hurst
(74) *Attorney, Agent, or Firm* — Renner, Otto, Boisselle & Sklar

(57) ABSTRACT

The present invention relates to a mobile communication device and a method for operating a mobile communication device with which triggering of a certain function can be avoided in some situations. The mobile communication device comprises an imaging section operable to acquire an image of a user of said mobile communication device, a user interface operable to receive an input of a user, and a controller configured to deactivate at least one function of said user interface based on an output signal of said imaging section.

14 Claims, 5 Drawing Sheets

MOBILE COMMUNICATION DEVICE AND METHOD FOR OPERATING A MOBILE COMMUNICATION DEVICE

FIELD OF THE INVENTION

The present invention relates to a mobile communication device and a method for operating a mobile communication device. In particular, the mobile communication device comprises a user interface, wherein a function of which may be deactivated.

BACKGROUND

Today's mobile communication devices comprise various functions not necessarily limited to receive and place a telephone call. Some mobile communication devices, such as smart phones, provide additional functions, such as playing music, making pictures or providing navigation information.

With an increase in different functions of a mobile communication device, such as a cell phone, or other type of mobile phone, there is also a need for more complex user interfaces. Currently more and more handsets are controlled through touch screens, which are sensitive to a finger or stylus placed on their surface, wherein different functions depending on the icon displayed on the touch screen can be selected by a user. Manually locking a touch screen or a keypad constituting a user interface or automatically locking after a certain time without usage of the keypad has expired, are known so that a function of the mobile communication device is not accidentally triggered.

However, there are situations in which a function is carried out and it is suddenly deactivated because another function is activated by the user accidentally pressing a key or an icon on the user interface. This is especially problematic when receiving an incoming call, since hanging up could be considered as rude by the caller, for example.

Due to the decrease in size of mobile communication devices a speaker, a keypad or touch screen, and a microphone are usually placed close to each other and due to the increasing sensitivity of keypads and touch screens, it is easily possible that the user receiving an incoming call accidentally interrupts the call by triggering another function, such as a call termination function when pressing the mobile device to his/her ear or cheek, for example.

Therefore, it is desirable to provide an improved mobile communication device and method therefore with which triggering of a certain function can be avoided in some situations.

DISCLOSURE OF INVENTION

A novel mobile communication device and method for operating the mobile communication device are presented and defined in the independent claims. Advantageous embodiments are defined in the dependent claims.

An embodiment of the invention provides a mobile communication device comprising an imaging section operable to acquire an image of a user of the mobile communication device, a user interface operable to receive an input of a user, and a controller configured to deactivate at least one function of the user interface based on an output signal of the imaging section. Accordingly, a function of a user interface can be deactivated so that accidentally triggering this function can be avoided. Therefore, the risk that an incoming call is terminated by accidentally hanging up when pressing the mobile communication device to the user's ear or cheek is minimized, for example.

In one embodiment, the controller is configured to compare a reference signal with the output signal of the imaging section. Accordingly, a comparison can be carried out and based on this comparison a certain function may be deactivated. For example, the controller is adapted to determine a degree of similarity between the reference signal and the output signal of the imaging section so that the deactivation is dependent on the degree of similarity.

In one embodiment, the reference signal comprises an image of at least part of a human head, such as the cheek contour or ear contour. Preferably, the output signal comprises an image acquired by the imaging section. Accordingly, both the reference signal and the output signal comprise images that may be analyzed using some kind of image processing algorithm to detect similarities.

In one embodiment, the controller is adapted to extract anatomic features of a human head from the image and preferably compares the reference signal comprising a reference image with the image of the imaging section. For example, the reference image may comprise contours of a human cheek or ear and the controller compares these contours of the reference image with extracted anatomic features from the image so that a degree of similarity between the two may be determined.

In one embodiment, the controller is adapted to activate the imaging device to acquire at least one image in response to the mobile communication device receiving an incoming call or in response to a specific input to the user interface. Accordingly, a mechanism for determining whether the mobile communication device is used, for example, close to a user's body part, such as the head, is provided. In particular, it is highly likely that if a user receives an incoming call, the user will accept that call and subsequently move the mobile communication device to his/her ear so that the imaging device will be activated in time to determine the position of the mobile communication device, such as the proximity to the user's head.

In one embodiment, the controller activates the imaging device to repeatedly acquire images in response to the mobile communication device receiving an incoming call or in response to a specific input to the user interface. Accordingly, several images may be taken to determine whether the user moves the mobile communication device closer to a body part so that there is a risk that the incoming call gets disconnected by accidentally triggering a termination function or any other function that could lead to the activation of a new function that may interfere with the incoming call.

In one embodiment, the user interface and the imaging section are arranged on the same side of the mobile communication device. According to such an arrangement, it is highly likely that the imaging section obtains an image of at least part of a human head once there is the risk that a function of the user interface gets triggered by pressing the mobile communication device to a user's head.

In one embodiment, the user interface comprises a touch screen device. Accordingly, several functions may be triggered by using the touch screen device which is highly flexible in functionality and sensitive in operation.

Another embodiment of the invention provides a method for operating a mobile communication device. The method comprises the steps of obtaining an output signal of an imaging section and deactivating at least one function of a user interface of the mobile communication device based on the output signal of the imaging section. Accordingly, accidentally triggering a function of the user interface that might disconnect an incoming call can be avoided.

In one embodiment, the method further comprises the step of obtaining and storing a reference signal and also preferably comparing the reference signal and the output signal and deactivating at least one function of a user interface of the mobile communication device based on the comparison.

In another embodiment, the mobile communication device comprises means for acquiring an image of a user of said mobile communication device, means for receiving an input of a user, and means for deactivating at least one function of said means for receiving based on an output signal of said means for acquiring.

BRIEF DESCRIPTION OF THE DRAWINGS

Embodiments of the invention will be described with respect to the following appended figures.

DESCRIPTION OF THE EMBODIMENTS

Embodiments of the invention are described with reference to the figures. It is noted that the following description contains examples only and should not be construed as limiting the invention.

In the following, similar or same reference signs indicate similar or same elements.

Figure 1:
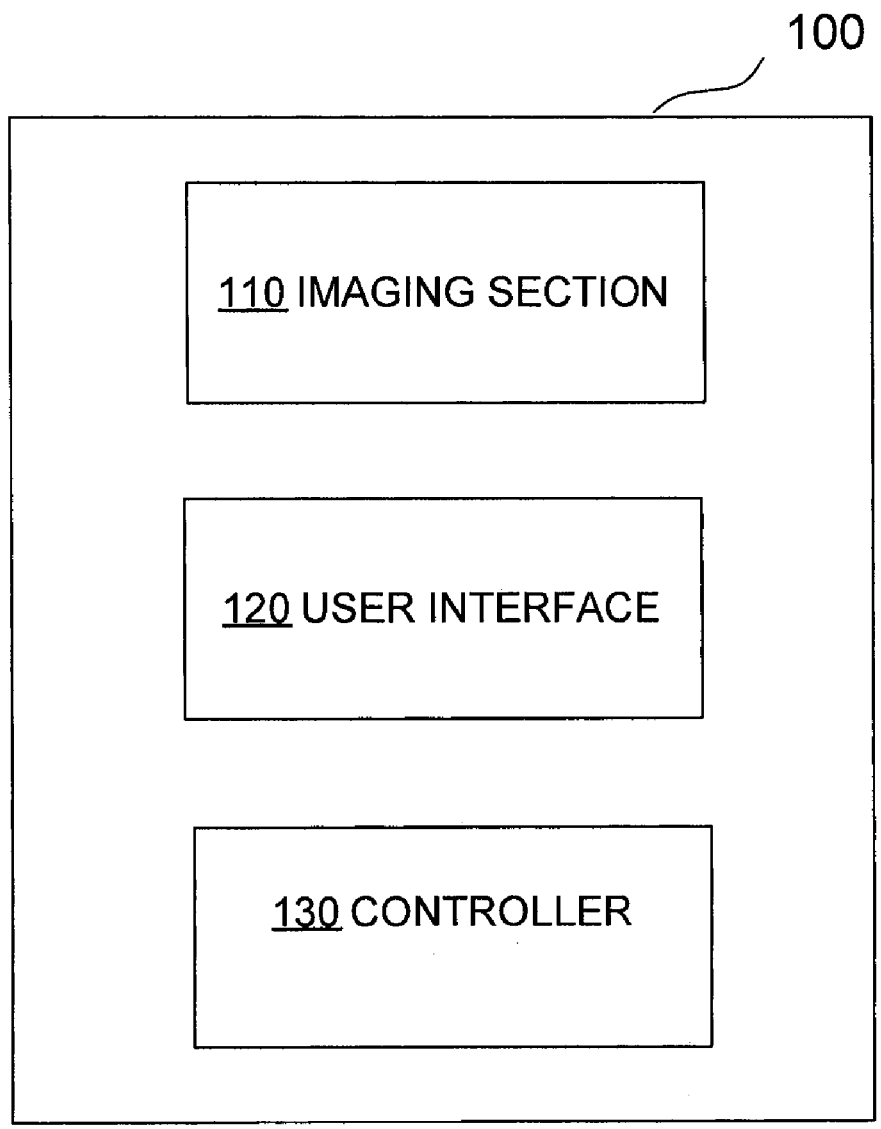
FIG. 1 illustrates a mobile communication device and elements thereof according to an embodiment of the invention.

FIG. 1 illustrates elements of a mobile communication device according to an embodiment of the invention. FIG. 1 illustrates the mobile communication device 100 comprising an imaging section 110, a user interface 120 and a controller 130.

The mobile communication device 100 may be a cell phone, or other type of mobile phone, or also a portable computer. The mobile communication device 100 may be basically any mobile device that may be used for communication between two parties or entities.

The imaging section 110 of the mobile communication device 100 is operable to acquire an image of a user of the mobile communication device 100. For example, the imaging section 110 may be a CCD (Charge-Coupled Device) camera comprising multiple pixels to acquire an image with high resolution. However, the imaging section 110 may also be an imaging section with lower resolution, such as a combination of photodiodes, e.g. two photodiodes, or other photo detectors. Currently, several available mobile phones comprise cameras, such as CCD cameras for making pictures or even for conducting video telephony using a VT (Video Telephony) camera. Other means for acquiring an image are also known, such as diode arrays.

The user interface 120 is a man-machine interface to accept input of a user and serves as means for receiving a user input operation. In particular, the user interface 120 receives an input of a user to trigger execution of a function of the mobile communication device. For example, a user interface may be a key or a keypad on a mobile communication device, wherein the key is representative for and triggers the function of accepting an incoming call. Similarly, also a key for terminating an incoming call may be provided.

It is not necessary that the keys are actual physical keys of a keypad but a key or keypad may be simulated by icons displayed on a touch screen device, which performs the same functions as a conventional keypad. A specific example of a user interface will be discussed with respect to FIG. 4 below.

The controller 130 is adapted to deactivate at least one function of the user interface 120 based on an output signal of the imaging section 110 and serves as means for deactivating a function. As described above, the user interface 120 may have several functions. In the example of receiving an incoming call and accidentally terminating the incoming call, it is thus desirable to deactivate the call termination function (hang-up function) of the user interface so that an accidental termination of a call can be avoided.

The deactivation of the call termination function is performed based on an output signal in this example, whereas the output signal of the imaging section gives information about the environment around and close to the imaging section 110.

For example, if an incoming call arrives and a telephone rings, it is usually in a pocket or bag of the user so there is only little light reaching the imaging section 110.

However, once the user takes out the mobile communication device and accepts the call, there is usually more light around the mobile communication device. Then, the amount of light reaching the imaging section can be determined and once the user moves the mobile communication device 100 close to his/her head, namely ear, the amount of light reaching the imaging section will be reduced. Therefore, a rough approximation of the position of the mobile communication device 100 may be performed by determining the amount of light either repeatedly in certain intervals or by determining a certain exposure time.

Similarly, it can also be determined whether the user moves the mobile communication device away from his head, since then the amount of light reaching the imaging section 110 should increase. Therefore, the controller may serve as a kind of proximity switch deciding on the position of the mobile communication device based on an output signal.

If only the amount of light reaching the front face of the mobile communication device, on which the interface section is located, is determined for deciding on the deactivation, it is also possible to use a photodiode on the front face or an ambient light sensor, which is already present in some devices.

As described above, in one example, after accepting a call, the call termination function is deactivated if the output signal indicates that there is no light. However, it is also possible that the controller compares the output signal of the imaging section 110 with a reference signal. The reference signal may be previously stored in a memory of the mobile communication device either by a set-up procedure of the user or already on the manufacturer side.

For example, the camera's internal programmable logic generates a reference signal at a specific set-up procedure that the user performs when setting up the mobile communication device. The reference signal may indicate a light level corresponding for example to a situation with a low light intensity, such as the ambient light level in a room in the evening lit with few artificial lights so that the light level detected by the imaging section of the mobile communication device when it is at the user's ear is lower, i.e. beneath the threshold established by the reference signal. Alternatively, the reference signal may indicate a light level corresponding to a typical situation when the mobile communication device is at the user's ear, and a function of the device may be deactivated if the light level detected by the imaging section is in a specific range, e.g. +/−10% of the light level indicated by the reference signal.

In another example, the reference signal comprises an image of at least part of a human head. This can be an image of a part of a user's head, such as the user's ear or cheek or both taken in a set-up procedure or it is also feasible to store as a reference image an image of an ear or cheek from another person. This will be described in more detailed with respect to FIGS. 3 and 5.

The controller 130 may then determine a degree of similarity between the reference signal and the output signal of the imaging section. This is especially useful if the output signal comprises an image so that individual anatomic features can be compared.

Figure 2:
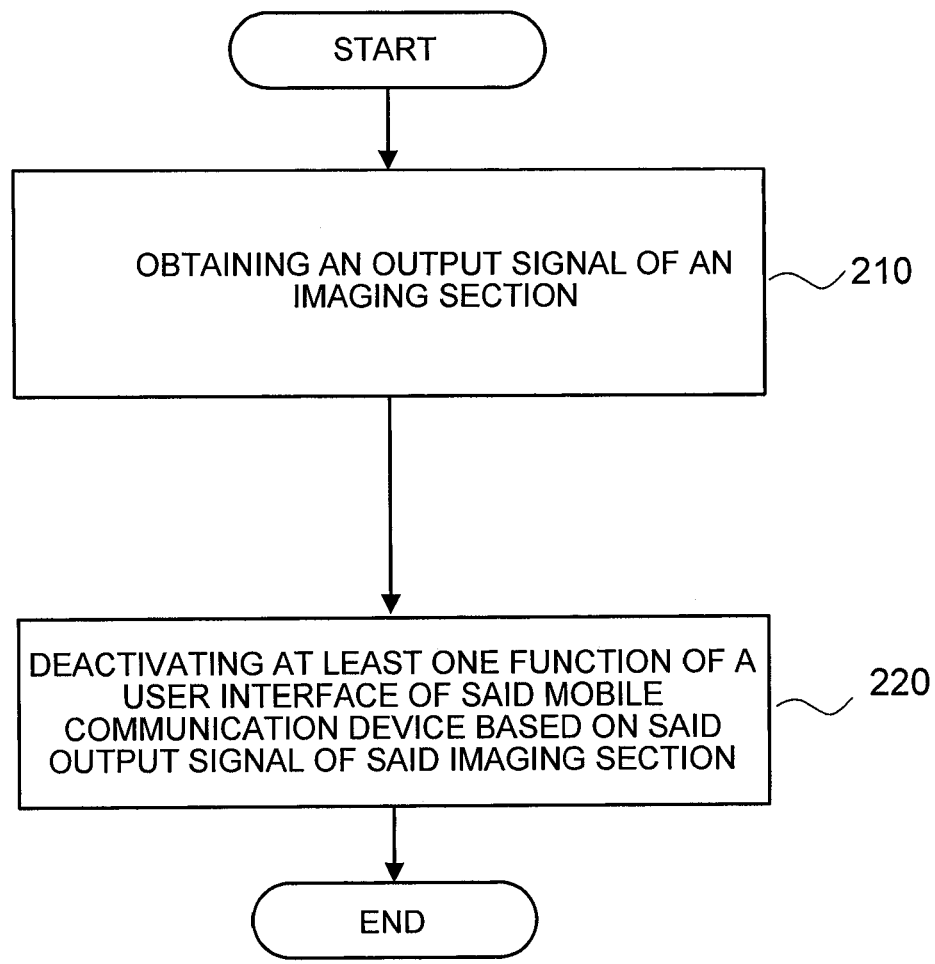
FIG. 2 illustrates a flow diagram of a method for operating a mobile communication device according to an embodiment of the invention.

In the following, operations of a method for operating a mobile communication device, such as the mobile communication device 100, will be described with respect to FIG. 2.

In a first step S210, an output signal of an imaging section is obtained. For example, a controller, such as the controller 130 described above, receives an output signal indicating a specific intensity of light, such as an electric signal with a certain strength.

Then, according to the output signal strength, a function of a user interface of the mobile communication device is deactivated in step S220.

As described above, the deactivation may be performed if no light or very little light reaches the imaging section so that a low output signal, e.g. corresponding to an electric power lower than 1 mW, is received by the controller, which then based on this signal deactivates a function, such as the call termination function. It is noted that 1 mW is only an example and, as described above, there are several ways of determining and setting up a suitable reference signal that may serve as a threshold value.

Figure 3:
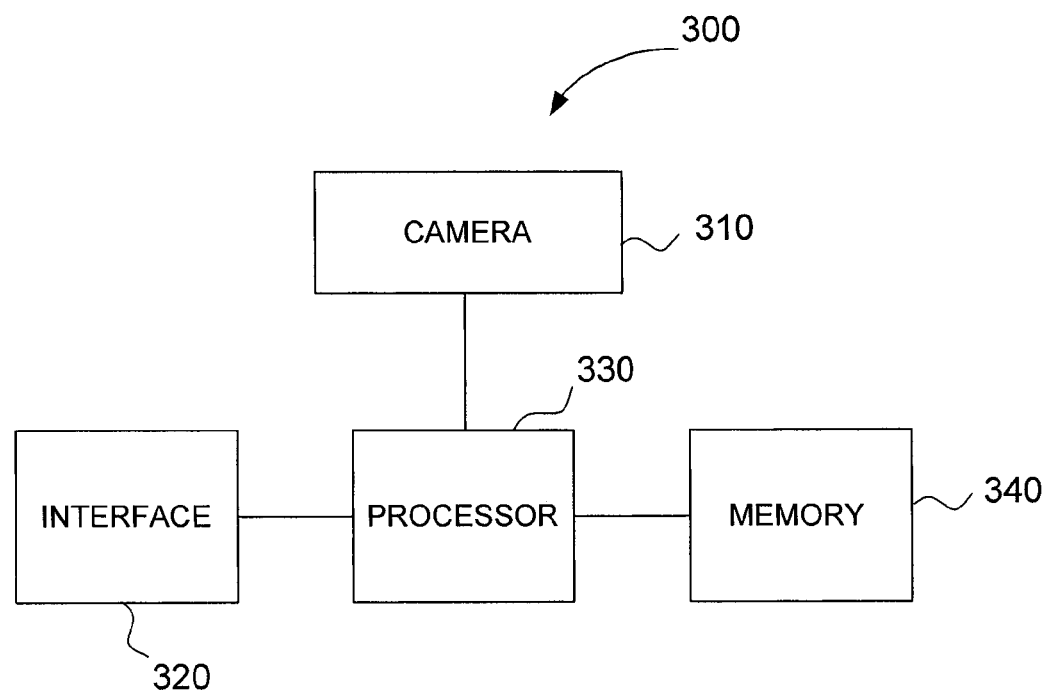
FIG. 3 illustrates a block diagram of a mobile communication device according to another embodiment of the invention.

FIG. 3 illustrates a block diagram of a mobile communication device according to another embodiment of the invention. The mobile communication device 300 in FIG. 3 comprises a camera 310, an interface 320, a processor 330 and a memory 340.

The camera 310 is an example of an imaging section, the interface 320 is an example of a user interface and the processor 330 performs the functions of a controller, such as the controller 130 previously described. The functions of these elements are similar or the same as discussed above with respect to FIG. 1. The memory 340 may be any suitable or desirable storage device and might be one or a combination of several of the following components, a RAM, a ROM, a hard disk, an EEPROM, a disk, a flash memory, etc.

The interface 320 is coupled to the processor, which is or which forms part of a controller, and receives a signal from the interface. For example, if the interface 320 comprises a touch screen device, the user operation on the touch screen device, e.g. pressing with a finger against the touch screen, is converted to an electrical signal which is supplied to the processor 330.

The processor 330 may be separate independent element or may be part of the camera or part of a central controller of the mobile communication device 300 or its functions may be split between a programmable logic of the camera and a central controller of the mobile communication device.

In an example of operation, when an incoming call arrives at the mobile communication device 300, the user may accept that call by carrying out a specific input operation on the interface 320, e.g. pressing an "accept call" icon on the touch screen. Then the processor 330 sends out a signal to the camera 310 to activate the camera so as to acquire one or more images. The acquired images by the camera 310 are then transferred to the processor 330, which is coupled to the camera or may even form part of the camera, and are compared to a reference image stored in the memory 340 coupled to the processor 330.

The reference images may be images of parts of the user's head, such as the ear or cheek or both or even the whole head, which have been taken previously in a set-up procedure and were stored for comparison. However, since the anatomic features of human heads are similar, such as the ear, but distinct from other objects in the environment of a mobile communication device user, it is also possible to store a sketch or a contour of a human ear in the memory 340 which is not the identical one of the user.

Figure 5A:
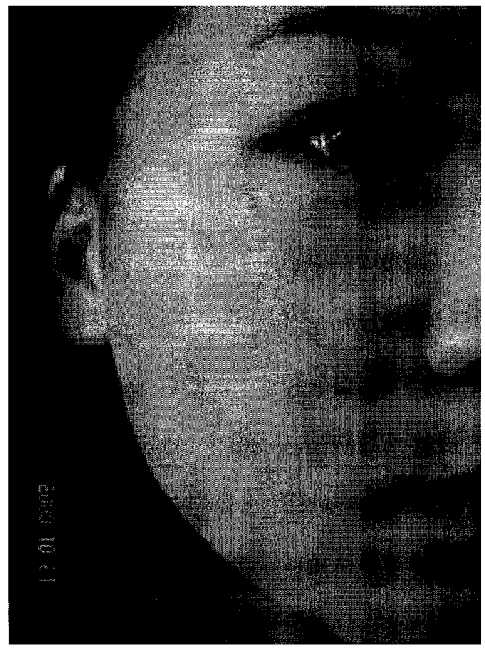
FIG. 5 illustrates an image and a contour of an image of parts of a human head.
Figure 5B:
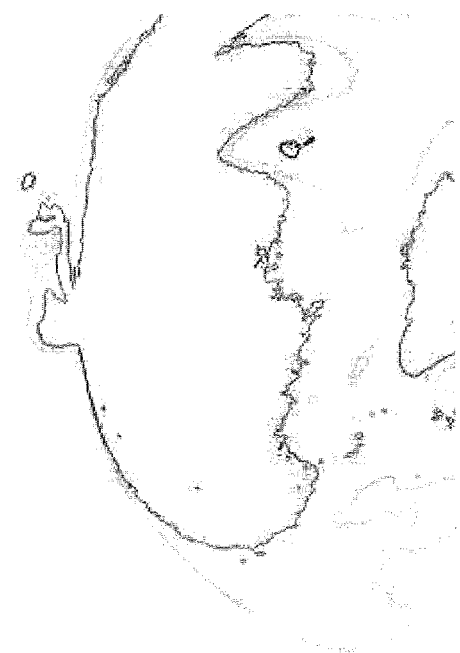

Therefore, an image such as the one shown in FIG. 5A or the one shown in FIG. 5B may be stored in the memory 340. FIG. 5A is an image of a part of a human body comprising the cheek, ear and an eye at high resolution and FIG. 5B is an image just showing a pattern or contours of the image 5A. If it is assumed that the user, once accepting the incoming call, moves the mobile communication device 300 towards his ear to listen to the caller, the camera 310 takes one or more images depending on the image acquisition time during the movement. The taken image or images is/are then compared by the processor 330 with the reference signal comprising a reference image stored in memory 340.

In detail, the processor 330 determines a degree of similarity between the reference image and the image obtained from the camera 330. Once it is determined that the image from the camera 310 shows parts of a human head, such as an ear, it is concluded that the mobile communication device 300 is in proximity to the user's head and a call termination function is deactivated so that the incoming call cannot be disconnected accidentally, as described above.

For judging a similarity, the image taken by the camera 310 may be processed so as to extract distinct contours that may be compared and matched with the contours of the stored reference image. Several image analysis processes are known to perform this task. The contours are, for example, anatomic features extracted by the processor 330, such as an ear, a cheek, an eye, parts of the nose or parts of the mouth as shown in FIG. 5B.

In another example, the camera 310 which may be a VT camera is started when an incoming call arrives without the need to press an "accept call" icon or key, and a specific command signal is sent to the camera to detect a cheek or ear or both. The camera then starts scanning and repeatedly compares the acquired images by camera 310 with reference images of a contour of a cheek or an ear or both previously stored in memory 340.

If the comparison is true, i.e. there is some similarity between the images, the processor triggers a general purpose input/output on a back-end ASIC (Application Specific Integrated Circuit), for example. This means that the mobile communication device 300 is approaching the user's head.

The camera scans with more than 30 frames per second, for example, to keep the whole detection process in a reasonable time, which is preferably less than approximately 1.5 seconds. When it is determined that the mobile communication device 300 approaches or approached the user's head, the processor controls the interface 320 and locks the displayed icons of the touch screen device. Preferably at least the call termination function icon is deactivated.

Specifically, if it is assumed that the processor is part of the camera, an interrupt request is requested by the camera and application software locks the displayed icons and shuts down the camera, since it is not needed anymore.

In case the camera is a VT camera and is already activated for a video call, i.e. the user indicated in advance that he/she would like to carry out a video call, there may be no need to lock the displayed icons, since it is assumed that a video call will be carried out with the user looking at the mobile communication device and not bringing it to the ear. A similar consideration also applies if a loudspeaker of the mobile device 300 is turned on for a hands-free telephone conversation allowing hands-free talking without the need to put the mobile communication device close to the ear.

Figure 4:
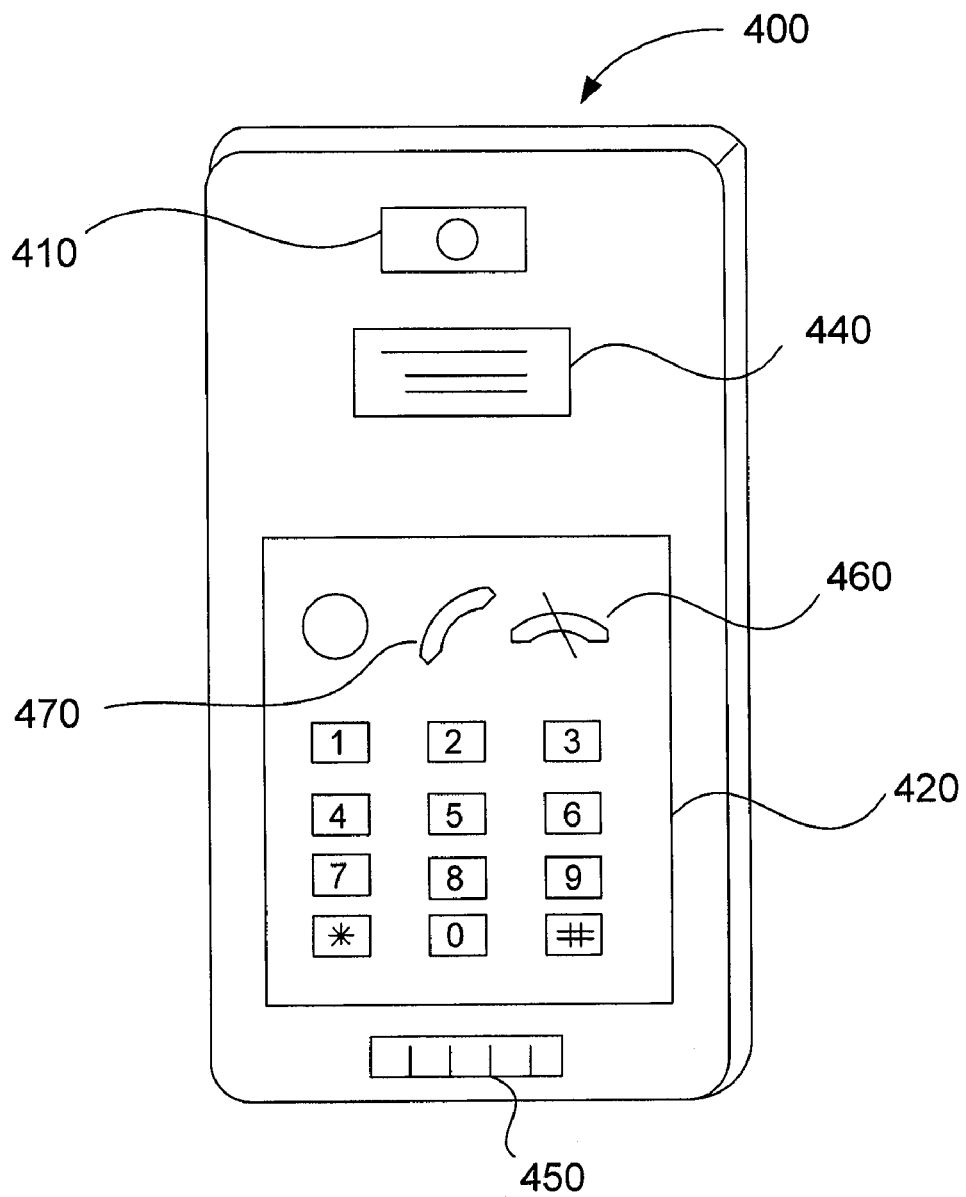
FIG. 4 shows schematically a mobile communication device according to another embodiment of the invention.

In FIG. 4 a specific example of a mobile communication device according to another embodiment is described, in particular with respect to the structural arrangement of the elements of a mobile communication device.

The mobile communication device 400 comprises a video telephony (VT) camera 410, a touch screen device 420 with displayed icons, such as a call termination icon 460 and a call accept icon 470, a speaker 440 and a microphone 450. A controller with a processing function, such as the controller 130 of FIG. 1 or a processor 330 of FIG. 3 is not shown but provided inside the housing. As described above, this controller may be a central controller or the functions of the controller 130 or processor 330 may be performed partly by the central controller and a processor of the camera 410. It is understood that there are several ways of distributing these functions between integrated circuits of a mobile communication device, which are well known to the skilled person.

As can be seen in FIG. 4, the touch screen device 420, which serves as a user interface, and the VT camera, which serves as an imaging section, are arranged on the same side of the mobile communication device 400 in close proximity so that the risk of accidental termination of a call by pressing on the icon 460 when having the mobile communication device close to the ear becomes apparent.

As can be seen in FIG. 4, the touch screen device 420 comprises several different functions, such as number input functions, which can also be deactivated independent of or in addition to the call termination function so that a beep or other audible signal or even disconnection is avoided when accidentally pressing one of these icons. Furthermore, as described above, it is possible to automatically activate these functions including the call termination function 460 again once the mobile communication device is moved away from the head of the user, if the VT camera repeatedly takes images, e.g. every two seconds, and the images taken again show an image of the users head or parts of it.

Alternatively, the deactivated functions can be manually activated by pressing a specific key combination which is usually not pressed accidentally when using the mobile communication device close to the ear.

The description above has mentioned several individual elements such as the controller 130, the imaging section 110, the user interface 120, the camera 310, the interface 320, the processor 330 and the memory 340, and it should be understood that the invention is not limited to these elements being independent structural units but these elements should be understood as elements comprising different functions. In other words, it is understood by the skilled person that an element in the above described embodiments is not construed as being limited to a separate tangible part but it is understood as a kind of functional entity so that several functions may also be provided in one tangible part or even where an element, such as the controller and processor performs several functions, these functions may be distributed to different parts.

Moreover, physical entities according to the invention and/or its embodiments and examples may comprise or store computer programs including instructions such that, when the computer programs are executed on the physical entities, such as a controller, processor, CPU or the similar, steps, procedures and functions of these elements are carried out according to embodiments of the invention.

For example, specially programmed software is used to be run on a processor, e.g. contained in the controller, to control the above-described functions, such as triggering the camera to take images, deactivating displayed icons on a touch screen, etc. The invention also relates to computer programs for carrying out functions of the elements, such as the method steps described with respect to a FIG. 2.

The above-described elements of the mobile communication devices 100, 300 and 400 may be implemented in hardware, software, field-programmable gate arrays (FPGAs), application-specific integrated circuits (ASICs), firmware or the like.

It will be appreciated that various modifications and variations can be made in the described elements, mobile communication devices and methods as well as in the construction of this invention without departing from the scope or spirit of the invention. The invention has been described in relation to particular embodiments which are intended in all aspects to be illustrative rather than restrictive. Those skilled in the art will appreciate that many different combinations of hardware, software and firmware are suitable for practicing the invention.

Moreover, other implementations of the invention will be apparent to the skilled person from consideration of the specification and practice of the invention disclosed herein. It is intended that the specification and the examples are considered as exemplary only. To this end, it is to be understood that inventive aspects may lie in less than all features of the single foregoing disclosed implementation or configuration. Thus, the true scope and spirit of the invention is indicated by the following claims.

The invention claimed is:

1. A mobile communication device, comprising
an imaging section operable to acquire an image of a user of said mobile communication device;
a user interface operable to receive an input of a user; and
a controller configured to compare a reference signal with an output signal of said imaging section, to determine whether the mobile communication device approaches a head of the user based on the comparison, and to deactivate at least one function of said user interface if it is determined that the mobile communication device approaches or has approached the head of the user,
wherein said controller is adapted to activate said imaging device to repeatedly acquire images in response to said mobile communication device receiving an incoming call or in response to a specific input to said user interface pertaining to a call.

2. The mobile communication device of claim 1, wherein said controller is adapted to determine a degree of similarity between the reference signal and the output signal of said imaging section.

3. The mobile communication device of claim 1, wherein said reference signal comprises an image of at least part of a human head.

4. The mobile communication device of claim 1, wherein the output signal comprises an image acquired by said imaging section.

5. The mobile communication device of claim 4, wherein said controller is adapted to extract anatomic features of a human head from the said image.

6. The mobile communication device of claim 4, wherein said controller is adapted to compare said reference signal comprising a reference image with said image of said imaging section.

7. The mobile communication device of claim 1, wherein said user interface and said imaging section are arranged on the same side of said mobile communication device.

8. The mobile communication device of claim 1, wherein said user interface comprises a touch screen device.

9. A method for operating a mobile communication device, comprising the steps
- activating an imaging section to repeatedly acquire images in response to said mobile communication device receiving an incoming call or in response to a specific input to a user interface pertaining to a call
- obtaining an output signal of the imaging section;
- comparing a reference signal with the output signal of the imaging section;
- determining whether the mobile communication device approaches a head of a user based on the comparison; and
- deactivating at least one function of a user interface of said mobile communication device if it is determined that the mobile communication device approaches or has approached the head of the user.

10. The method for operating a mobile communication device of claim 9, further comprising the step
- obtaining and storing the reference signal.

11. A mobile communication device, comprising means for repeatedly acquiring images of a user of said mobile communication device;
- means for receiving an input of a user;
- means for comparing a reference signal with an output signal of said means for acquiring;
- means for determining whether the mobile communication device approaches a head of the user based on the comparison; and
- means for deactivating at least one function of said means for receiving if it is determined that the mobile communication device approaches or has approached the head of the user,
- wherein the means for repeatedly acquiring images is activated in response to said mobile communication device receiving an incoming call or in response to a specific input to the means for receiving an input of the user, which pertains to a call.

12. The mobile communication device of claim 1, wherein the specific input is an input for accepting an incoming call.

13. The mobile communication device of claim 9, wherein the specific input is an input for accepting an incoming call.

14. The mobile communication device of claim 11, wherein the specific input is an input for accepting an incoming call.

* * * * *

UNITED STATES PATENT AND TRADEMARK OFFICE
CERTIFICATE OF CORRECTION

PATENT NO. : 8,280,432 B2
APPLICATION NO. : 12/574200
DATED : October 2, 2012
INVENTOR(S) : Kahsay Tsegay It is certified that error appears in the above-identified patent and that said Letters Patent is hereby corrected as shown below:

Front page, Section (73) "Assignee: Sony Mobile AB, Munich (DE)" should read:
-- Assignee: Sony Ericsson Mobile Communications AB, Lund (SE) --

Signed and Sealed this
Second Day of April, 2013

Teresa Stanek Rea
*Acting Director of the United States Patent and Trademark Office*